(12) United States Patent
Engler et al.

(10) Patent No.: US 6,700,695 B2
(45) Date of Patent: Mar. 2, 2004

(54) MICROSTRUCTURED SEGMENTED ELECTRODE FILM FOR ELECTRONIC DISPLAYS

(75) Inventors: David A. Engler, Woodbury, MN (US); Rolf W. Biernath, Wyoming, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 09/808,128

(22) Filed: Mar. 14, 2001

(65) Prior Publication Data

US 2002/0131151 A1 Sep. 19, 2002

(51) Int. Cl.[7] .................. G02B 26/00; G09G 3/34; G03G 17/04
(52) U.S. Cl. ............... 359/296; 359/254; 345/107; 430/32
(58) Field of Search ................... 359/296, 254; 430/32, 34, 38; 345/105, 107; 204/600, 450

(56) References Cited

U.S. PATENT DOCUMENTS

| | | |
|---|---|---|
| 3,612,758 A | 10/1971 | Evans et al. |
| 4,126,854 A | 11/1978 | Sheridon |
| 4,261,653 A | 4/1981 | Goodrich |
| 4,290,174 A | 9/1981 | Kalleberg |
| 4,438,160 A | 3/1984 | Ishikawa et al. |
| 5,077,870 A | 1/1992 | Melbye et al. |
| 5,201,101 A | 4/1993 | Rouser et al. |
| 5,262,098 A | 11/1993 | Crowley et al. .............. 264/8 |
| 5,344,594 A | 9/1994 | Sheridon .................. 264/4.1 |
| 5,389,945 A | 2/1995 | Sheridon ................... 345/85 |
| 5,737,115 A | 4/1998 | Mackinlay et al. ......... 359/296 |
| 5,751,268 A | 5/1998 | Sheridon ................... 345/107 |
| 5,754,332 A | 5/1998 | Crowley .................... 359/296 |
| 5,760,761 A | 6/1998 | Sheridon ................... 345/107 |
| 5,777,782 A | 7/1998 | Sheridon ................... 359/296 |
| 5,815,306 A | 9/1998 | Sheridon et al. ........... 359/296 |
| 5,825,529 A | 10/1998 | Crowley .................... 359/296 |
| 5,982,346 A | 11/1999 | Sheridon et al. ............. 345/85 |
| 6,055,091 A | 4/2000 | Sheridon et al. ........... 359/296 |
| 6,128,124 A | 10/2000 | Silverman .................. 359/296 |
| 6,222,513 B1 | 4/2001 | Howard ...................... 345/84 |
| 6,362,807 B1 * | 3/2002 | Baba et al. ................ 345/107 |
| 6,392,786 B1 | 5/2002 | Albert ........................ 359/296 |
| 6,396,621 B1 | 5/2002 | Sheridon .................... 359/296 |

FOREIGN PATENT DOCUMENTS

| EP | 0 902 410 A2 | 9/1998 |
|---|---|---|
| EP | 0 935 230 A2 | 5/1999 |

* cited by examiner

*Primary Examiner*—Hung Xuan Dang
*Assistant Examiner*—Tuyen Tra
(74) *Attorney, Agent, or Firm*—Stephen W. Buckingham

(57) ABSTRACT

The display panel comprises surrounding media containing particles which are responsive to changes in a magnetic field are optically anisotropic toward the viewing surface. The electrode film has an array layer and an electrode layer, where the array layer provides a support structure for the electrode layer and electrically non conductive and in contact with the surface of the display panel and having. a plurality of mesa shaped segments where each mesa shaped segment has a top face and side walls extending downward from the top face. The electrode layer formed of an electrically conductive material coats the array layer and is exposed for contact by an electrical stimulus. The electrode layer is thicker on the top face than on the side walls, producing resistive bridges between adjacent top faces. The resistive bridges partially electrically isolate each electrode from the other electrodes in the electrode layer.

17 Claims, 10 Drawing Sheets

MICROSTRUCTURED SEGMENTED ELECTRODE FILM FOR ELECTRONIC DISPLAYS

BACKGROUND OF THE INVENTION

The present invention relates to visual displays, and more particularly to addressable, reusable, paper-like visual displays, such as "gyricon" (or twisting particle) displays or other forms of electronic paper, such as particulate electrophoretic displays, which are available from E-ink Corporation. Specifically, the invention relates to substrates usable as a writing surface for gyricon displays or electronic paper.

A gyricon display, also called a twisting-ball display, rotary ball display, particle display, dipolar particle light valve, etc., offers a technology for making a form of electric paper and other electronically controlled displays. Briefly, a gyricon display is an addressable display made up of a multiplicity of optically anisotropic particles, with each particle being selectively rotatable to present a desired face to an observer. For example, a gyricon display can incorporate "balls" where each ball has two distinct hemispheres, one black and the other white, with each hemisphere having a distinct electrical characteristic (e.g., zeta potential with respect to a dielectric fluid) so that the ball is electrically as well as optically anisotropic. The balls are electrically dipolar in the presence of the fluid and are subject to rotation. A ball can be selectively rotated within its respective fluid-filled cavity, for example, by application of an electric field, so as to present either its black or white hemisphere to an observer viewing the surface of the sheet.

A reflective image is formed by the pattern collectively created by individual black and white hemispheres. By the application of an electric field addressable in two dimensions (as by a matrix addressing scheme), the black and white sides of the balls are controlled as the image elements (e.g., pixels or subpixels) of a displayed image. Alternatively, the display may be controlled by shaped electrodes to form one or more fixed images.

The balls are typically embedded in a sheet of optically transparent material, such as an elastomer sheet. A dielectric fluid, such as a dielectric plasticizer, is used to swell the elastomer sheet containing the balls. Through this swelling, the dielectric fluid effectively creates a fluid-filled cavity around each ball. The fluid-filled cavity accommodates the ball and allows the ball to rotate within its respective fluid-filled cavity, yet prevents the ball from migrating within the sheet.

When an electric field is applied to the sheet over a bead, the electrical force on the bead overcomes the frictional adhesion of the bead to the cavity wall and causes the bead to rotate. Once rotation is complete, each bead will remain in a fixed rotational position within its cavity. Thus, even after the electric field is removed, the structures (balls) will stay fixed in position until they are dislodged by another electric field. This bistability of the beads enables the gyricon display to maintain a fixed image without power. The bistability of a gyricon display is beneficial over other types of displays such as a liquid crystal display (LCD) or a light emitting diode (LED) display which consume energy to maintain an image. Gyricon displays are thus particularly useful for displays which will show an image for a prolonged period of time and only periodically have the image changed.

Gyricon displays are not limited to black and white images, as gyricon and other display mediums are known in the art to have incorporated color. Gyricon displays have been developed incorporating either bichromal color, trichromol color, or four quadrant colored balls. Also developed are three or four segmented colored balls, as disclosed in U.S. Pat. No. 6,128,124 (Silverman, ADDITIVE COLOR ELECTRIC PAPER WITHOUT REGISTRATION OR ALIGNMENT OF INDIVIDUAL ELEMENTS), incorporated by reference herein.

The colored balls can be charged by adsorption of ions from a liquid onto the ball surface. Alternatively, colored balls can be charged by electret formation by injection of an external charge into the surface region of a colored ball, as is disclosed in U.S. Pat. No. 6,072,621 (Kishi, COLOR BALL DISPLAY SYSTEM), incorporated by reference herein.

Like ordinary paper, electric paper preferably can be written on and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and can be conveniently placed into a shirt or coat pocket and then later retrieved, restraightened, and read substantially without loss of information. Yet unlike ordinary paper, electric paper preferably can be used to display full-motion and changing images as well as text. While gyricon displays are particularly useful for displays where real-time imagery is not essential, gyricon displays are adaptable for use in a computer system display screen or a television.

Gyricon display arrangements have typically taken one of three forms: (1) a slurry coat with balls randomly dispersed in a relatively thick film, (2) a monolayer where balls are closely packed in a layer; or (3) a dual layer, where balls are closely packed in a first layer and a second layer of balls is provided to fill in the voids. To create displays which appear brighter with sharper images, gyricon displays should have high light reflectance. One way to improve the reflectance of a monolayer gyricon display is to closely pack the bichromal balls. However, in dual or multiple layer displays, the packing density of the balls may be of little consequence insofar as overall display reflectance is concerned, because balls located farther from the viewing surface of the gyricon display will "fill in the gaps" between balls located nearer the viewing surface. So long as the two-dimensional projection of the balls onto the viewing surface at all distances from the viewing surface substantially covers the viewing surface, a high-quality display will be obtained.

In the context of gyricon displays, the "balls" are not necessarily perfectly round or hemispherical. Instead of balls, a gyricon display can use substantially cylindrical bichromal particles rotatably disposed in a substrate. The twisting cylinder display has certain advantages over the rotating ball gyricon display because the bichromal elements can achieve a higher packing density. The higher packing density leads to improvements in the brightness of the twisting cylinder display as compared to the rotating ball gyricon display.

One drawback to twisting particle displays (using balls, cylinders, etc.) is that the quality of the image viewed is dependent on the rotatability of the structures within the fluid. In practice, a particle may not rotate completely or not at all, thus only partially exposing the white or black color or a mix therebetween. Incomplete rotation or non-rotation causes a loss in image contrast and color purity. It is therefore desirable to improve the resolution of the image on the display by improving the rotatability of the structures within the fluid.

To achieve still higher packing density, a gyricon display can be constructed without elastomer and without cavities. In such a display, the bichromal balls are placed directly in the dielectric fluid. The balls and the dielectric fluid are then sandwiched between two retaining members (e.g., between the addressing electrodes) with no elastomer substrate.

Substrates usable as a writing surface for Gyricon displays are known in the prior art. EPO 942,405 A2 (Howard et al., "CHARGE RETENTION ISLANDS FOR ELECTRIC PAPER AND APPLICATIONS THEREOF") discloses a pattern of conductive charge retaining islands on the surface of a Gyricon sheet.

In addition to using the present invention with Gyricon displays, the invention can also be used in combination with particulate electrophoretic displays, such as available from E-Ink Corporation, or other electronic paper. A particulate electrophoretic display, such as available from E-Ink Corporation (or electronic ink) comprises transparent "microcapsules" filled with a densely colored fluid such as a dark ink. Contained inside the micro capsule shell are hundreds of tiny solid spheres of a different color, such as brilliant white titanium dioxide, each of which has a negative charge. The micro capsules are typically sandwiched between a transparent conductive top electrode and a bottom electrode. The negatively charged titanium dioxide spheres are held against the bottom side of the micro capsule by a positive static electric field. When the particles are held against the bottom side, the white particles are submerged below the viewing surface of the colored dye inside the micro capsules. When the polarity of the electric field is reversed, the micro capsules are repelled by the negative field and are attracted to the transparent top electrode where the particles coat the top side viewing surface of the micro capsule. The coating of the viewing surface suddenly changes from the color of the dark ink to the color of the white spheres. Thus, a particulate electrophoretic display, such as available from E-Ink Corporation does not require the micro capsules to rotate in order to show a change of color, but rather requires migration of the minute particles within the fluid contained in the micro capsule.

BRIEF SUMMARY OF THE INVENTION

The present invention is a micro structured film having a plurality of isolated electrodes usable as a writing surface for a display panel for gyricon displays or electronic paper. The specific geometry of the isolated electrodes is an array of raised mesas having a semiconductive deposition on the top layer. The individual mesa shaped electrodes are individually addressable by a stylus or other electrical stimulus. The display panel has a viewing surface and a backside surface opposing the viewing surface. The display panel contains particles which are responsive to changes in an electric or magnetic field and are optically anisotropic. The conductive electrode film is preferably transparent to visible light.

The electrode film has an array layer and an electrode layer, where the array layer provides a support structure for the electrode layer. The array layer is electrically non conductive and is disposed toward the display panel. The array layer has a fabricated texture, such as a plurality of mesa shaped segments where each mesa shaped segment comprises a top face and side walls extending downward from the top face. The electrode layer is formed of an electrically conductive material and coats the array layer. The electrode layer is exposed for contact by an electrical stimulus, such as a stylus. The electrode layer can be deposited by a sputtering process, wherein the electrode layer is thicker on the top face than on the side walls producing resistive bridges between adjacent top faces. The resistive bridges partially electrically isolate each electrode from the other electrodes in the electrode layer. Thus, each shaped electrode is capable of being individually addressed by a stylus without addressing other electrode segments.

Figure 1:
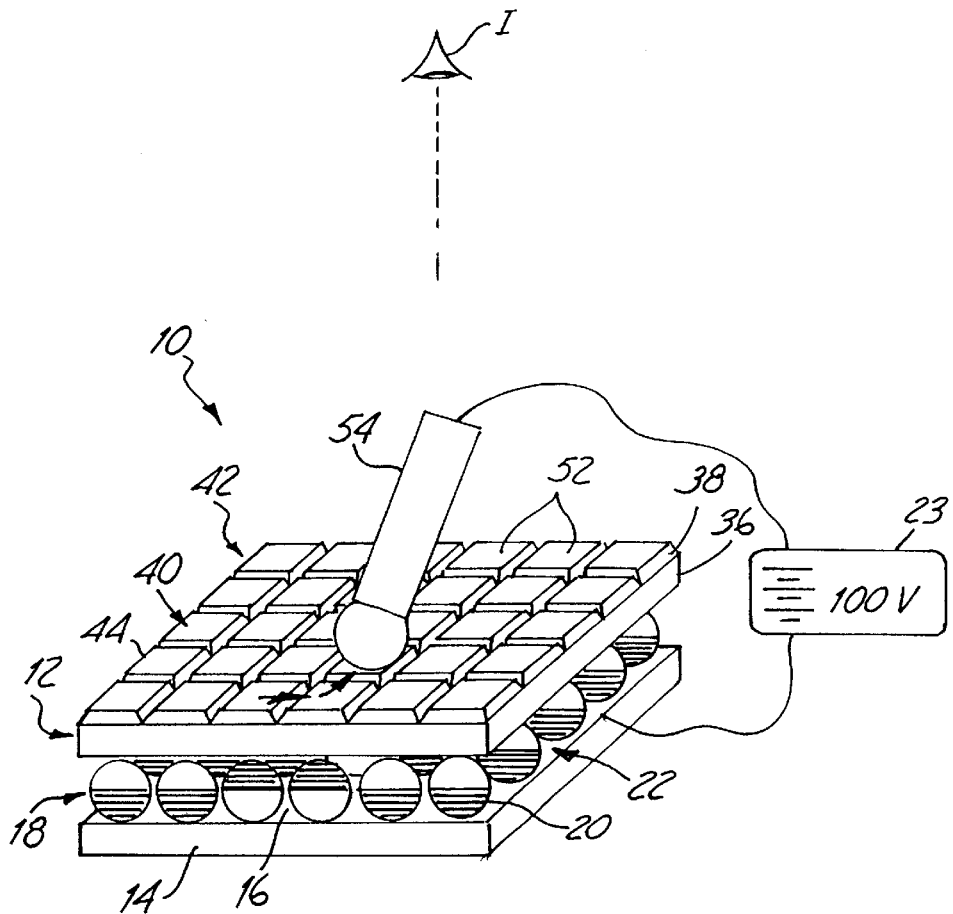
FIG. 1 is a perspective view of a portion of a display in accordance with the invention.
Figure 2:
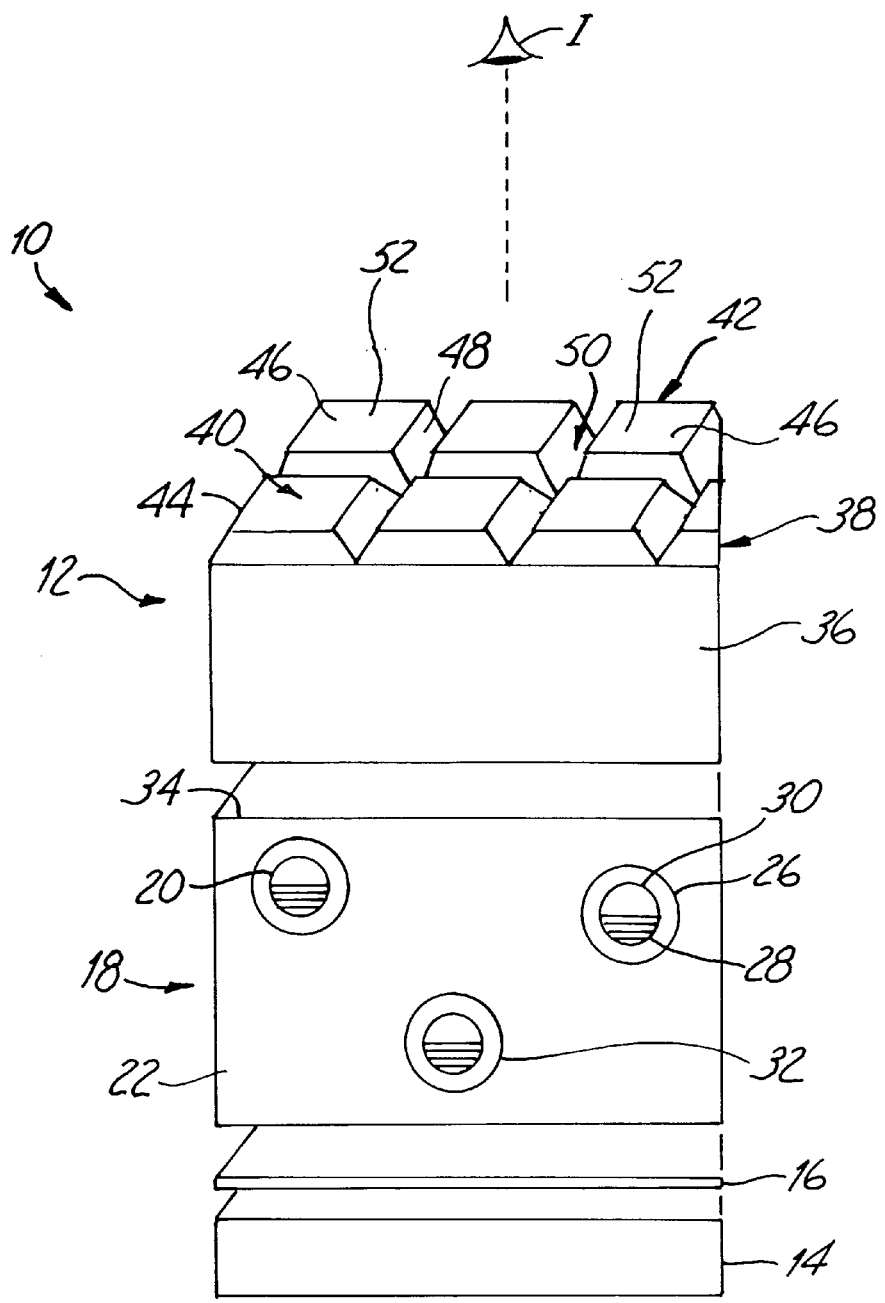
FIG. 2 is a sectional exploded view of the display of FIG. 1.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that FIGS. 1 and 2 have not been drawn to scale, as it has been necessary to enlarge certain portions for clarity. It should also be noted that FIGS. 1 and 2 show idealized representations of balls. In the application some balls may be irregularly shaped or have swirled or mixed colors and sometimes speckles on the balls.

DETAILED DESCRIPTION

FIG. 1 shows a visual display 10 having the inventive electrode film 12. The display 10 includes a bottom substrate 14 with a backside electrode 16. A display panel 18 is sandwiched between the electrode film 12 and the bottom substrate 14. The display panel 18 has bichromal particles 20 disposed in a surrounding media 22 (not shown in FIG. 1 for clarity). As shown in FIG. 1, an electrical potential source 23 is electrically grounded to the backside electrode 16.

The electrode film 12 is preferably positioned on a viewing side of the display and is preferably optically transparent. With an optically transparent electrode film, ambient light can impinge upon the display panel 18 through the electrode film 12 (from above in FIGS. 1 and 2), and ambient light incident upon the display panel 18 will reflect to provide an image at I, as shown in FIG. 1.

The bottom substrate 14 is a nonconductive layer. The bottom substrate 14 can be made of any electrically insulative material and is preferably a sheet of plastic. If flexibility of the display 10 is desired, the bottom substrate 14 should be flexible. The primary purpose of the bottom substrate 14 is to support the backside electrode 14 and to electrically insulate the backside electrode against contact.

The backside electrode 16 is preferably positioned on the bottom substrate 14 toward the display panel 18. The backside electrode 16 covers the surface of the bottom substrate 14 and can be made of any electrically conductive or semiconductive material. Alternatively, the backside electrode 16 could cover the bottom surface of the bottom substrate 14. While the backside electrode 16 is a simple plate electrode in the preferred embodiment shown, the backside electrode 16 could alternatively be electronically addressable.

The particles 20 of the display panel 18 are preferably rotating spheres, balls or beads. Alternatively, the particles can be of any shape including twisting cylinders as disclosed in U.S. Pat. No. 6,055,091 (Sheridon, "TWISTING-CYLINDER DISPLAY"), which is incorporated by reference herein. The balls 20 are of the same type that is typically found in Gyricon displays. Gyricon display technology is described further in U.S. Pat. No. 4,126,854 (Sheridon, "TWISTING BALL PANEL DISPLAY") and U.S. Pat. No. 5,389,945 (Sheridon, "WRITING SYSTEM INCLUDING PAPER-LIKE DIGITALLY ADDRESSED MEDIA AND ADDRESSING DEVICE THEREFOR"), which are incorporated by reference herein.

The particles 20 are optically anisotropic, such as hemispherically bichromal. The optical anisotropy of the particles 20 may be caused by a coating having a difference in Zeta potential, thereby causing the particles 20 to have a corresponding electrical anisotropy. An acquired electrical charge is shown symbolically in FIG. 3 where dark hemispheres 28 are more positive than light hemispheres 30. With the electrical anisotropy, particles 20 are subject to rotation such by an electric or magnetic field powered by the electrical potential source 23 (shown in FIG. 1).

Gyricon displays are not limited to bichromal structures. Gyricons incorporating color have been described in U.S. Pat. No. 5,760,761 "HIGHLIGHT COLOR TWISTING BALL DISPLAY", U.S. Pat. No. 5,751,268 "PSEUDO-FOUR COLOR TWISTING BALL DISPLAY", U.S. patent application Ser. No. 08/572,820 "ADDITIVE COLOR TRANSMISSIVE TWISTING BALL DISPLAY"now U.S. Pat. No. 5,892497, U.S. patent application Ser. No. 08/572,780 "SUBTRACTIVE COLOR TWISTING BALL DISPLAY"now U.S. Pat. No. 5,767,826, and U.S. Pat. No. 5,737,115 titled "ADDITIVE COLOR TRISTATE LIGHT VALVE TWISTING BALL DISPLAY", which are incorporated by reference herein.

The size of the particles 20 can be selected based upon the distance from which the display 10 is intended to be read and the desired resolution of the display 10. For example, the particles 20 can be 0.05 to 0.5 millimeters in diameter.

Figure 3:
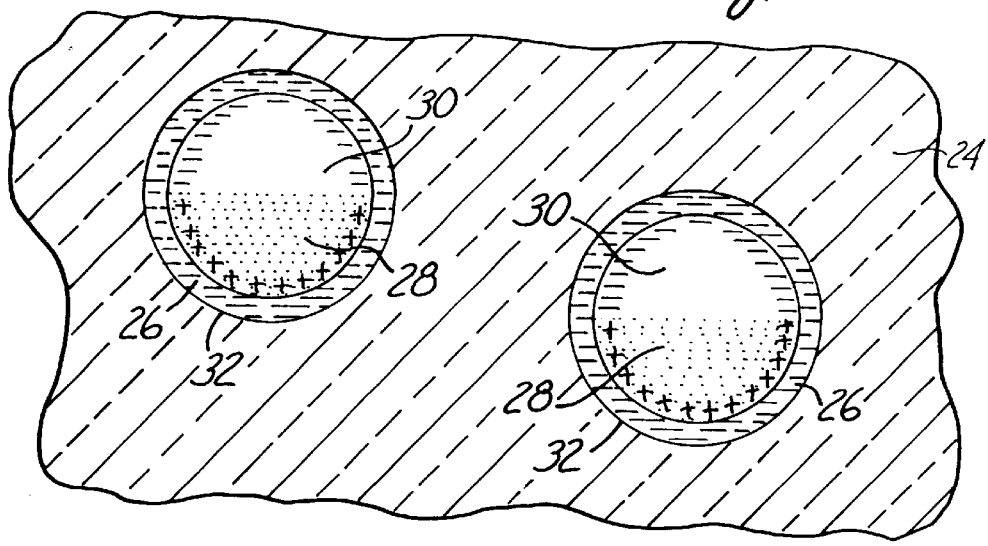
FIG. 3 illustrates an enlargement of a portion of the display of FIG. 1.

The particles can be made of many materials as known in the Gyricon art. For example, the particles can be formed of crystalline polyethylene wax. FIG. 3 is an enlarged view, showing a dark coating applied to one hemisphere 28 of each of the spheres 20 to exhibit optical absorption characteristics, as illustrated by their dark shading, and a second coating is applied to the other hemisphere 30 of each of the spheres 20 to exhibit light reflectance characteristics, as illustrated by the absence of dark shading. The difference between the light reflectance-light absorption characteristics of hemispheres 28 and 30 provides the desired optical anisotropy. Specifically, the spheres 30 could be formed of black polyethylene containing a charge activation agent in one hemisphere with a light reflective material, for example, titanium oxide filled polyethylene in the other hemisphere. Alternately, the black polyethylene and the titanium oxide could be sputtered on hemispheres 30a, 30b to provide the spheres 30 with the desired light reflective and light absorptive hemispheres. Alternately, the anisotropic spheres 30 could be coated with differently colored dielectric coatings, with a charge activation agent added to one of the coatings. Black coatings may be obtained by the simultaneous evaporation of magnesium fluoride and aluminum in a vacuum chamber, whereas white coatings may be obtained by the slow deposition of indium.

The balls 20 are disposed in a surrounding media 22 which may include support material such as a transparent elastomer 24 swelled with dielectric fluid 26 (See FIGS. 2 and 3). The surrounding media 22 permits the particles 20 to have the desired rotational freedom under application of a switching field, while the surrounding media 22 sufficiently contacts the particles 20 so bistability is maintained, i.e., the particles 20 do not rotate absent the application of a switching field. The surrounding media 22 prevents the particles form having translational freedom. The display panel 18 has an optically transmissive viewing surface 34.

As an alternative to using elastomer 24, the surrounding media 22 can be a dielectric fluid with no elastomer. U.S. Pat. No. 5,754,332 (Crowley, MONOLAYER GYRICON DISPLAY) and U.S. Pat. No. 5,825,529 (Crowley, GYRICON DISPLAY WITH NO ELASTOMER SUBSTRATE), both incorporated by reference herein, disclose gyricon or twisting-ball displays in which optically anisotropic particles are disposed directly in a working fluid, such as a dielectric liquid, without an elastomer substrate or other cavity-containing matrix.

As shown in FIGS. 2 and 3, each of the spheres 20 is located within a cavity 32 of the transparent support material 24. Cavities 32 have a diameter slightly larger than the diameter of spheres 20 so that spheres 20 have the necessary rotational freedom without translational freedom. An optically transparent dielectric liquid 26 fills the voids between spheres 20 and cavities 32.

Figure 3A:
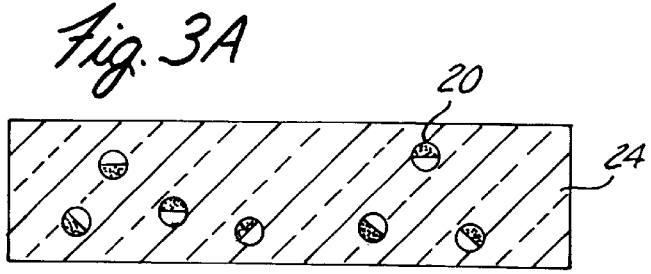
FIGS. 3A, 3B, 3C show a method in accordance with the invention of making the display of FIG. 1.
Figure 3B:
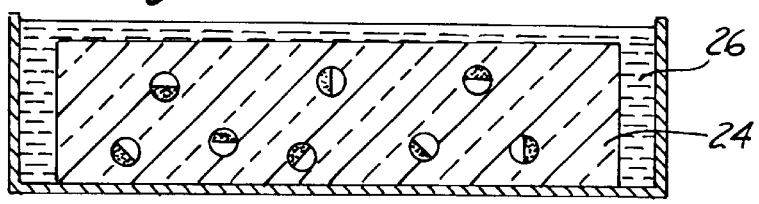
Figure 3C:
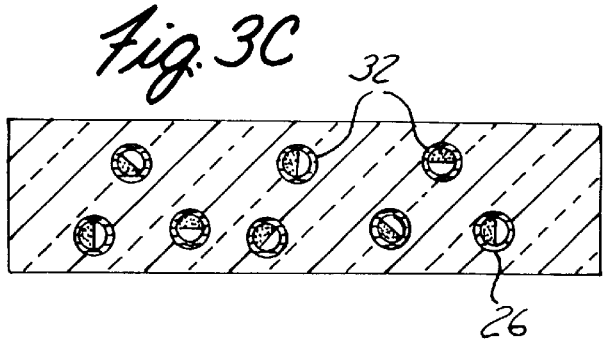

FIGS. 3A, 3B and 3C exemplify the method of forming the preferred display 18. The preferred panel 18 is formed by thoroughly mixing the optically anisotropic particles 20 with an uncured (flowable), optically transparent material, for example, an uncured elastomer such as Dow Corning SYLGARD 182. The optically transparent material 24 then cured, such as in the case of SYLGARD 182 by rapid heating to an elevated temperature of about 140° C. and maintaining the elastomer 24 at that temperature for about 10 minutes and then cooled to room temperature. In its initially cured state as shown in FIG. 3A, the elastomer 24 restricts the spheres 20 from either rotational or translational movement. Following curing of the support material 24, the support material 24 is placed in a dielectric liquid plasticizer 26, as shown in FIG. 3B, for a period of time, typically overnight, with the plasticizer 26 at room temperature. For example, the dielectric liquid plasticizer 26 can be silicone oil, such as Dow Corning 10 Centistoke 200 oil when the elastomer is SYLGARD 182. Another satisfactory elastomer/plasticizer combination is Stauffer and Waker V-53 elastomer with the above silicone oil.

When the cured support material 24 is placed in the plasticizer 26, the plasticizer 26 is absorbed by the support material 24 resulting in a swelling of the support material 22. The spheres 20 are made of a material which does not readily absorb the plasticizer 26 at operating temperatures, with the result that the swelling of the support material 24 creates voids (spherical cavities 32) around the spheres 20, as shown in FIG. 3C. The voids or cavities 32 are filled with the plasticizer 26 and this structure allows easy rotation of the spheres 20, while permitting essentially no translation of spheres 20.

The support material 24 need not be an elastomer and in lieu thereof can be a rigid plastic such as polyethylene, polystyrene or plexiglass. Encapsulation can be achieved with the encapsulant molten or dissolved in a volatile solvent. An uncured rigid material such as an epoxy can be used as the encapsulant provided that it is light transparent. It is necessary that the material of support material 24 absorb the plasticizer 26 in order that the cavities 32 may be formed. When the support material 24 is an elastomer, the spheres 20 can be plastics such as polyethylene or polystyrene which do not absorb the plasticizer 26 at working temperatures. When the support material 24 is plastic, the spheres 20 may be of a material, such as glass.

In an optional embodiment the display panel 18 is a particulate electrophoretic display, such as available from E-Ink Corporation or electronic paper display utilizing non-rotating microcapsules instead of the rotating gyricon particles. U.S. Pat. No. 5,930,026 to Jacobson et al. titled NONMISSIVE DISPLAYS AND PIEZOELECTRIC POWER SUPPLIES THEREFOR, U.S. Pat. No. 6,120,588 to Jacobson titled ELECTRONICALLY ADDRESSABLE MICROENCAPSULATED INK AND DISPLAY THEREOF, and U.S. Pat. No. 6,130,774 to Albert et al. titled SHUTTER MODE MICROENCAPSULATED ELECTROPHORETIC DISPLAY each disclose a type of encapsulated electrophoretic display and are incorporated herein by reference.

Figure 4:
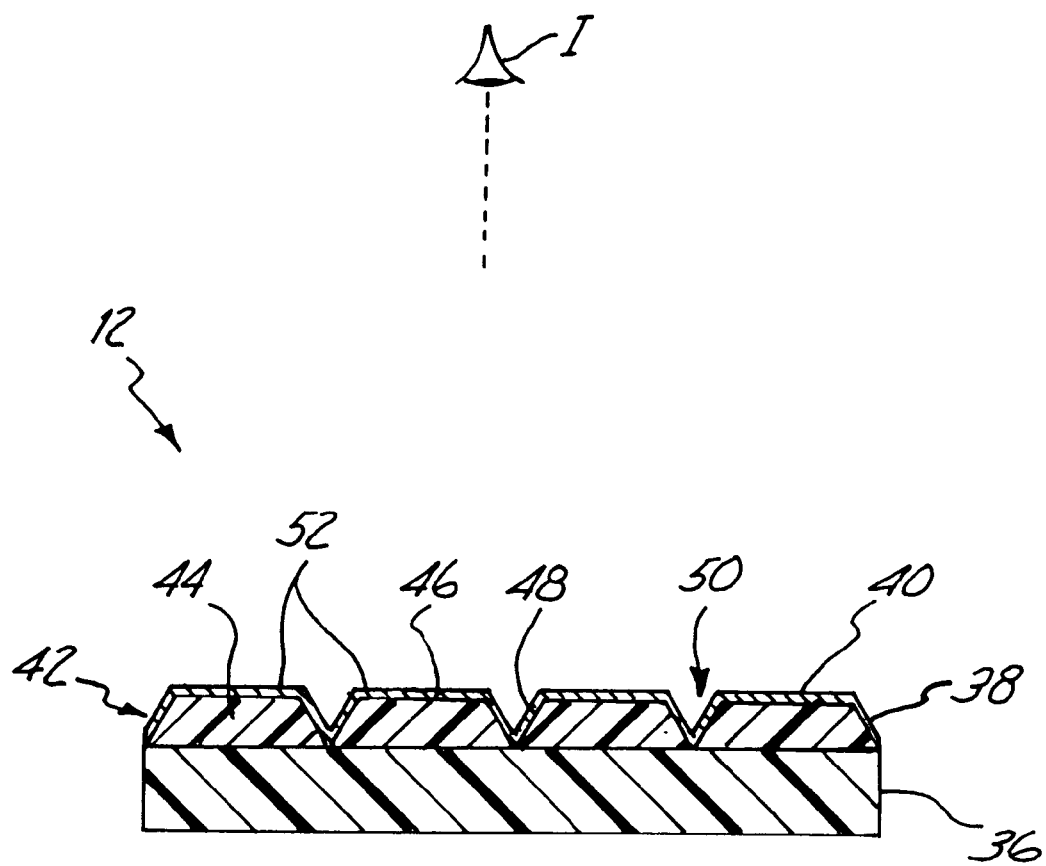
FIG. 4 is a cross sectional view of the electrode film 12 of FIGS. 1 and 2.

The electrode film 12 of the present invention is positioned in contact with the viewing surface 34 of the display panel 18. As shown in FIG. 4, the electrode film 12 preferably includes a support layer 36, an array layer 38 and a top electrode layer 40.

The support layer 36 and the array layer 38 can be formed together to provide a support structure for the top electrode layer 40. Both the support layer 36 and the array layer 38 are electrically nonconductive. The support layer 36 and the array layer 38 are preferably transparent.

The array layer 38 provides a textured surface 42. As can be seen in FIGS. 1 and 2, the textured surface 42 includes a plurality of mesa structures 44 each having an electrode support face 46 extending generally in a common plane. Each mesa structure 44 has peripheral side walls 48 around the electrode support face 46. The peripheral side walls 48 define valleys 50 relative to the electrode support faces 46. As best shown in FIG. 4, the preferred electrode support faces 46 are substantially flat, and the preferred peripheral side walls 48 define V-shaped valleys 50. The side walls 48 preferably recess at included angles of 70° or greater relative to the top face 46.

For ease of manufacturing, the mesa shaped segments 44 are provided in an array having a repeatable mesa size and a repeatable distance between each mesa shaped segment 44. As best shown in FIGS. 1 and 2, the preferred electrode support faces 46 are square, each providing four peripheral side walls 48 of equal length. Variations to the shape of the top face and the number of side walls are also possible and within the scope of this invention. The shape and slope of the sidewalls can also vary.

The mesas 44 are sized in accordance with the size of the particles 20 and in accordance with the desire resolution of the display 10. For instance, the mesas 44 can measure anywhere from 1 to 50 microns in height and 5 to 200 microns in length. The preferred mesas 44 measure 100 microns square, with electrode faces 46 elevated 25 microns above the bottoms of the valleys 50. The valleys 50 measure 25 microns wide and extend in a crisscross pattern.

By forming the mesa structures 44 out of a film having layers of two different materials, the height of the mesas 44 is easily repeatable in manufacturing, without overly reducing the strength of the film. In the preferred embodiment, the support layer 36 is a polyester (polyethylene terephthalate or "PET") backing with the array layer 38 being a copolyester heat seal layer over the support layer 36. The support layer 36 combined with the array layer 38 can be formed as a PET/co-PET film. The co-PET polymer, also called "80-20", is poly(ethylene terephthalate-co-ethylene isophthalate), of which 80% by mole is the former polymer type. The isophthalate component of the co-PET film provides a melt temp and a degree of crystallization below that of the PET layer. The physical effect of the isophthalate produces a co-PET layer embossable below temperatures where the PET softens or melts. Thus the overall film, which is biaxially oriented, is not relaxed on the PET side during thermal embossing of the co-PET side. The support (PET) layer 36 is preferably thicker than the array (co-PET) layer 38, such as a support layer thickness of approximately 1.2 mils and an array layer thickness of approximately 0.8 mils. As an alternative to the dual structure of the support layer 36 and the array layer 38, the mesas 44 could be formed into a single homogeneous layer of material.

The plurality of mesa shaped segments 40 are formed into the co-PET layer. One method of forming the microstructured mesas 40 into the co-PET layer is to compression mold such as with a silicone rubber mold (not shown). The pattern used for the preferred structure was 200 LPI (lines per inch). Press conditions were 160 degrees C., and the time 3 minutes, and the pressure 6 tons for a sheet measuring 6×8 inches. The press was cooled to 100 C. before removal of the sample.

The electrode layer 40 is deposited on top of the array layer 38 in a relatively thin coating. For example, in the preferred embodiment, the electrode layer 40 is formed to be about 4 nanometers thick. The electrode layer 40 is formed of an electrically conductive material, exposed for contact. The top electrode layer 40, thus provides a plurality of electrodes 52. Each mesa shaped segment 44 of the array layer 38 provides a support structure for one of the electrodes 52. The top electrode layer 40 has an electrode thickness over each mesa shaped segments 44 of sufficient thickness and sufficient conductivity to form a substantially conductive electrode plate 52.

In the preferred embodiment, the conductive layer 40 is formed of Indium Tin Oxide (ITO). ITO is a transparent conductor, allowing the display panel 12 to be viewed through the segmented electrode film 12.

The preferred method of forming the electrode layer 40 is through deposition such as by a sputtering process. It is believed that such a deposition process produces and electrode layer 40 which is significantly thinner on the sidewalls between the mesas 44 than it is over the electrode support surface 46. Sputter coating offers many advantages over conventional polymer coating techniques. ITO is a very expensive material, and is also potentially a limited natural resource. Sputter coating is advantageous because sputter coating the ITO utilizes the ITO very efficiently, depositing the ITO in a thinner layer than other conventional coating processes (4 nanometers compared to 70 nanometers). Secondly, a thinner deposition of ITO from sputter coating results in a higher light transmittance and clarity. The microstructured surface also exhibits reduced glare when compared to conventional ITO coated polyester. Thirdly, it is an additive process, so no ITO is wasted by a removal process.

The electrode layer 40 has a electrode thickness over the mesa shaped segments 44 of sufficient thickness and sufficient conductivity to form substantially conductive electrode plates 52. As a consequence of the steep sidewall 48, the sputter coating process deposits a much thinner layer of ITO on the sidewalls 48 than it does on the top faces 46 of the mesas 44. Thus, the electrode layer 40 has a valley thickness over the side walls 48 which is thinner than the top face thickness. The thinner ITO (valley thickness) has a much higher resistance than the thicker ITO (top face thickness). As a result, the valley thickness forms resistive bridges 51 between adjacent electrode plates 52. The resistive bridges 51 partially electrically isolate each electrode 52 from the other electrodes 52 in the electrode layer 40. This enables one electrode 52 in the array 40 to be selectively addressed (energized) without substantially addressing the surrounding electrodes 52.

In the preferred embodiment, sputter coating 40 of the ITO was performed in a roll to roll process under the following conditions: ITO (90:10), In2O3:SnO2, DC power 1.5 kW, Argon 200 sccm, Oxygen 3.6 sccm, pressure 4.5 mTorr. At 32 per feet per minute web line speed, it is estimated that approximately 4.4 nanometers of ITO was deposited over the top face 46 of the microreplicated surface. Additional web speeds of 16, 8, 4, and 2 feet per minute result in nominally 8.8, 17.6, 35 and 70 nanometer thick ITO coatings 40. The ITO thickness estimates are for the flat tops 46 of the micro structured mesas.

Workers skilled in the art would understand that deposition of a conductive material, such as ITO, is not limited to sputter coating. Other techniques for depositing conductive material, including boiling the metal in a vapor deposition process and electroless metal deposition, are also possible. In addition, vapor coating the top surface first would result in a smaller amount of conductive material deposited in the valleys. Alternatively, the mesas can be formed subsequent to the deposition of a conductive coating in a one step process, such as by stamping or by pressing the mesa shape into the top surface. This one step process would decrease the amount of conductive coating wasted by not involving a chemical etching process or a costly laser ablation process.

Other methods are possible as an alternative to deposition coating of a conductor to provide the electrode layer 40. For instance, a hotmelt adhesive may be pressed onto a surface of a transferable conductor, such as graphite. The mesa structures may be pressed into the adhesive/graphite so the graphite adheres to cover the mesa tops 46 in a substantially conductive layer, while leaving the valleys 50 substantially less conductive. If necessary to permit sufficient conductivity in the resistive bridges 51 between mesa tops 46, a thin coating of a conductor or semiconductor in the valleys 50 may be extended over the mesas in a uniform thickness prior to enhancing the conductivity of the mesa tops with the transferable conductor.

As an alternative to forming the mesa structures 44 prior to applying the electrode layer 40, the mesa pattern can be embossed subsequent to coating the top surface with a conductive coating. Such a method would stretch the conductive coating in newly formed valleys, rendering the mesa electrode tops substantially but not totally electrically isolated from its neighbors.

Subsequent to deposition of a conductive coating, the electrode layer 40 could also be textured. Texturing of the electrode layer 40 produces a matte or rough finish to the conductive coating 40. A textured surface finish tends to reduce glare on the display 10. The sidewalls 48 also reduce glare by preventing reflection from occurring in the valleys 50 between the electrode plates 52.

Several different mechanisms can be used so the segmented mesa electrode layer 12 is useful in writing on a gyricon display 18. As shown in FIG. 1, a stylus 54 is connected to the electrical potential source 53. The source 53 provides an electrical differential of 100 Volts relative to the backside electrode 16 place a charge on electrodes 52 which are contacted by the stylus 54. Once an electrode 52 is activated, the particles 20 contained in the display 18 rotate responsively to show a difference in color. In practice, a stylus 54 or other electrical stimulus can be used to selectively address one electrode 52 in the array 40 or a series of electrodes 52 in the array 40 without addressing the entire display 18. Thus, the stylus 54 acts as a writing instrument to address only those electrodes 52 the stylus 54 contacts. By addressing the particles 20 of the corresponding contacted electrode segments 50, the stylus 54 effectively writes indicia thereby producing a visible image.

As an alternative to the stylus, the display 10 could be addressed by a printhead (not shown) having an array of contacts. The printhead could transfer charge quickly and simultaneously to several selected electrodes 52.

In an optional embodiment, the mesas could comprise an elastomeric material for better durability during use. Elastic mesas with a conductive coating would better withstand the forces applied to the top surface from a stylus.

Figure 4A:
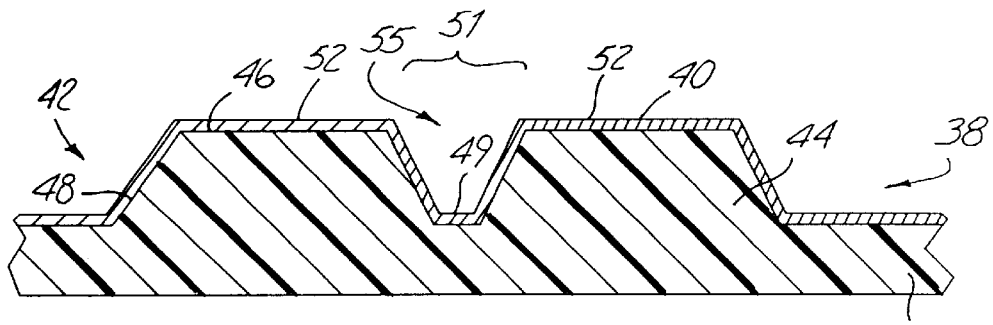
FIGS. 4A–E illustrate optional embodiments of the electrode film.

FIGS. 4a–4d show alternative geometries for mesas. In one embodiment, as shown in FIG. 4a, the side walls 48 meet at a trough 49 forming a trapezoidal valley 55. In this embodiment, the sputter coating process deposits a layer of ITO into the trough 49 creating a trough thickness. Because the trough 49 and the top face 46 are substantially parallel, the trough thickness is substantially equal to the top face thickness. Nonetheless, the thinner deposition over the sidewalls still results in resistive bridges 51 between electrodes.

Figure 4B:
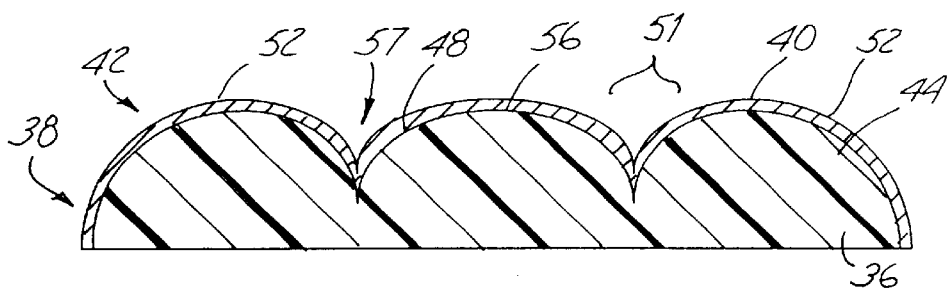
Figure 4C:
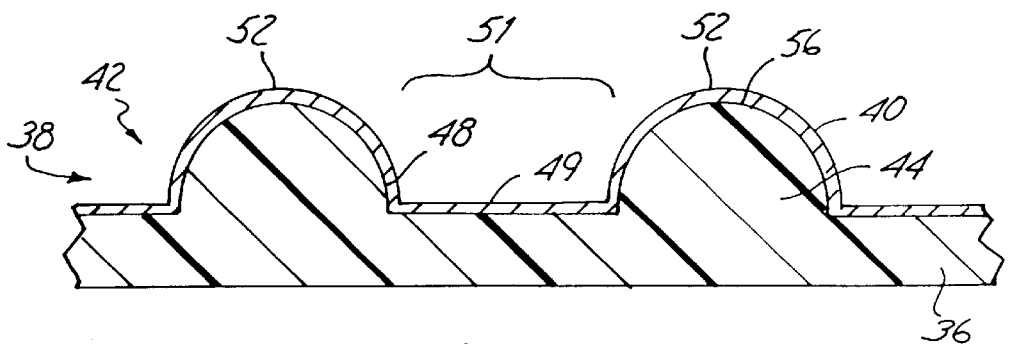
Figure 4D:
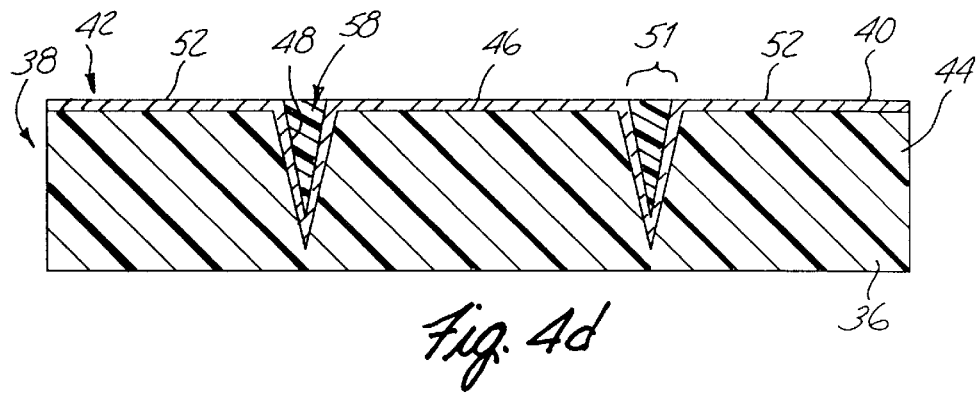

In other optional embodiments, shown in FIGS. 4b through 4d, the side wall angle, side wall slope, valley width, valley depth, mesa height and mesa shape have been adjusted to tune the degree of isolation of each electrode by varying the thickness of the conductive coating on the top surface. The embodiments of FIGS. 4b and 4c have mesas with rounded top surfaces 56, where FIG. 4b has curved valleys 57 and FIG. 4c has trapezoidal valleys 55 and troughs 49. As a result, FIGS. 4b, 4c can have optical properties as a lens structure in addition to the segmented electrode properties. The teachings of M507-12.0016 regarding optical enhancement structures are incorporated by reference. While convex structures are shown in FIGS. 4b and 4c, convex mesa tops could also be used.

A common problem associated with electric paper is that such devices are subject to inadvertent tribo-electric writing. Electric charges applied inadvertently by tribo-electric exchanges during handling can create electric fields causing the image on the display to change. The tribo-electric fields threaten image retention and stability for any display using field addressed electric paper sheets.

To combat the effects of tribo-electric fields, the top electrode layer could be coated with a material that protects against inadvertent tribo charging on the outer surface. In addition, the valleys of the mesa structures could also be filled with a protective material 58. An embodiment with filled valleys is shown in FIG. 4*d*. The material 58 in the valleys also helps protect the electrode layer from frictional wear associated with dragging the stylus across the electrode tops. The protective material is added after the conductive layer is added. Optionally, the material used for protecting against inadvertent tribo-charging could be partially conductive in the lateral direction with respect to the display image.

Figure 4E:
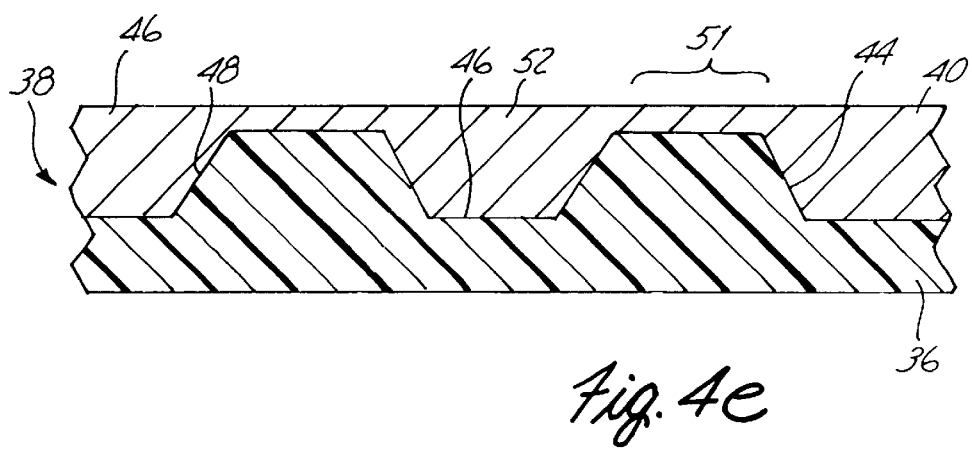

In all embodiments, the electrodes are not entirely electrically isolated from one another, but rather are connected with resistive bridges 51. Electrodes separated by resistive bridges 51 can alternatively be formed through the reverse mesa structure shown in FIG. 4*e*. In FIG. 4*e*, the thermoplastic material is microfabricated with a female pattern of reverse mesas corresponding to the male pattern shown in FIG. 4*a*. Instead of deposition coating with a conductive material, the reverse mesas are flooded with conductive or semiconductive material. The electrodes 52 over the reverse mesas are thus substantially thicker than the resistive bridges 51 between electrodes 52. The embodiment of FIG. 4*e* provides a smooth top surface, minimizing tribo-charging and wear similar to the embodiment of FIG. 4*d*.

Throughout these embodiments, the electrodes 52 described have of substantially equal x and y dimensions. In all these various embodiments, any of the described mesa shapes can extend for a substantial distance in one direction (i.e., into the page). That is, the electrode film could have resistance bridge grooves between substantially parallel conductors. Instead of one electrode film with mesa patterned formations, two electrode films could sandwiched the display 18. The grooves of one electrode film are oriented orthogonally to the grooves of the other electrode film. The two electrode films enable addressing and indexing selected crossover points to form an image.

Figure 5:
FIG. 5 is a photo of the surface of the microstructured inventive electrode film after having an electrical stimulus address the display and write indicia thereon.

FIG. 5 shows a photo of the preferred embodiment in which a stylus has written "MESA FILM" across the surface of the microstructured electrode film 12. Because each mesa electrode 52 is partially isolated from the other mesa electrodes 52 in the array 40, writing speed affects the resulting line width. Rapid strokes make narrow lines and slower strokes make broader lines. When making rapid strokes, the image lagged the stroke by a noticeable fraction of a second. Line thickness "bleed over" could be improved by using a more optimized microstructure and using a more columnated sputtering process.

Figure 6:
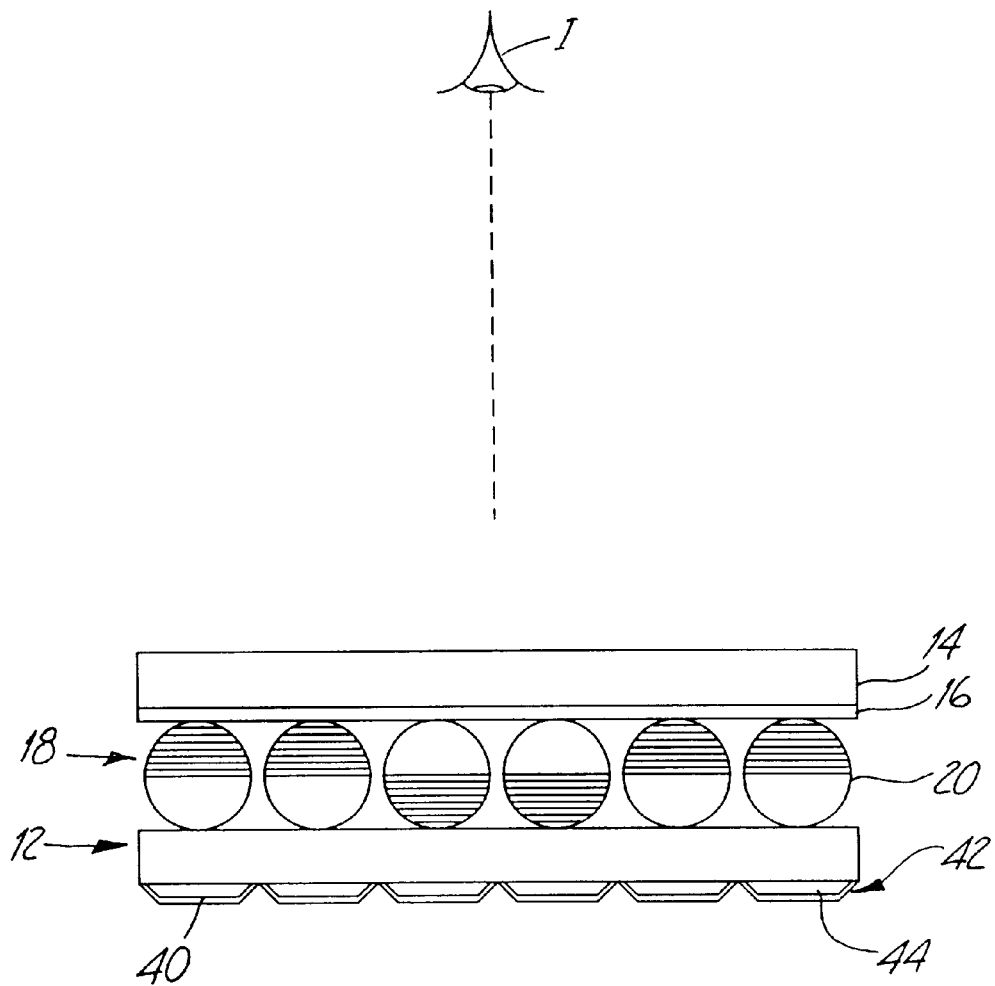
FIG. 6 is a sectional view of a display in accordance with the present invention where the display is viewed opposite I in FIG. 1.

As an alternative to a transparent segmented electrode film, the embodiment shown in FIG. 6 has a bottom substrate 14 and a backside electrode 16 which are optically transparent. The display 10 viewed from I (opposite I in FIG. 1) and through the bottom substrate 14 and backside electrode 16. For instance, the backside electrode 16 could be formed of Indium Tin Oxide (ITO) which is a clear metallic conductor. The electrode layer 40 could then be formed of a metal, such as aluminum, thereby increasing the durability of the electrode film. The primary benefit of viewing the display 10 through an optically transparent electrode film 12 of the preferred embodiment is that indicia can be written on the front side similar to paper, rather than writing a mirror image of the desired indicia on the non viewing side of the display.

The present invention offers substantial benefits over the structure disclosed in EPO 942,405. The charge retaining islands disclosed in EPO 942,405 A2 have narrow channels of insulating material to prevent migration of charge laterally across the sheet. The disclosure of EPO 942,405 A2 is directed at isolating the islands to provide a buffer mechanism to maintain an electric field for an extended period of time, theoretically forever. The object of the present invention is not to completely isolate each electrode 52 in the array 40 to retain charge. Rather, the present invention allows the tuning of the degree of electrical isolation of the electrodes. Tuning the degree of isolation of each electrode is accomplished by controlling the sidewall angles, sidewall slope, mesa height, mesa shape; valley width, valley depth and sputtering conditions. The specific geometry of the mesa shaped segments 44 will determine the amount or thickness of conductive coating on the array layer 38, thereby affecting the amount of resistance between electrodes 52.

The electrode film 12 of the present invention has been described for use with gyricon media. However, workers skilled in the art will appreciate that the electrode film 12 is equally applicable for use in conjunction with other types of electric field addressable media, such as particulate electrophoretic displays, which are available from E-Ink Corporation.

Thus far the electrode film of the present invention has only been discussed as a permanent part of the display media. In another optional embodiment, the electrode film could be separate from the Gyricon or particulate electrophoretic displays, such as available from E-Ink Corporation. The electrode film 12 of the present invention can be formed entirely separate from the display, as can the backside electrode 16. When a user desires to write or mark on the display, the display would be positioned by the user between the backside electrode 16 and the electrode film 12. After writing, the user would separate the display from the backside electrode 16 and electrode film 12. The image written on the display would then be substantially indelible until the user decided to rewrite by again positioning the display between the backside electrode 16 and the electrode film 12.

Figure 7:
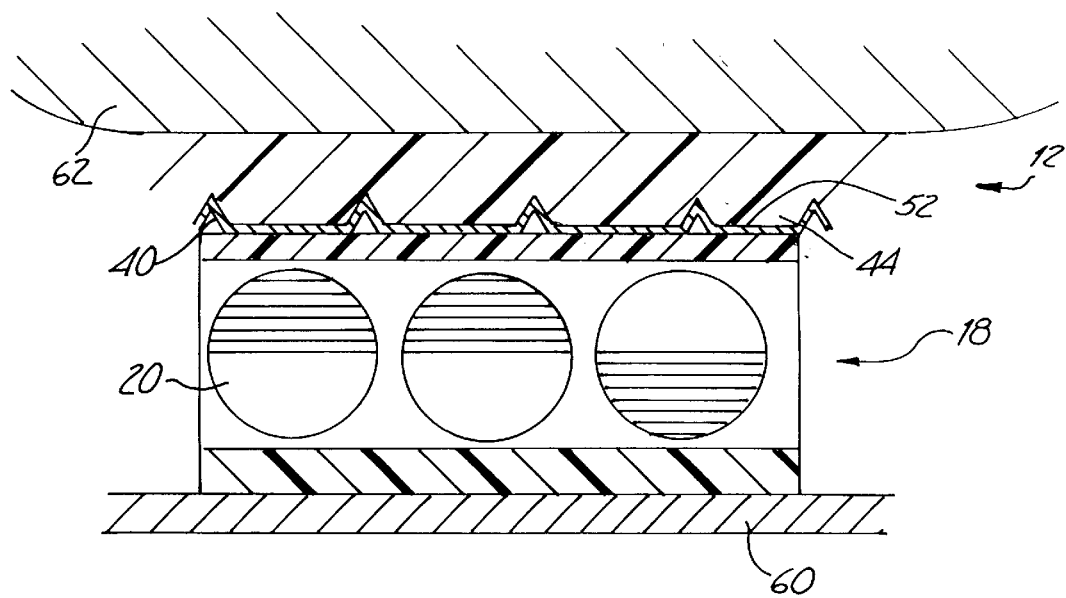
FIG. 7 is a sectional view of a display in accordance with the present invention disposed in a printer utilizing the inventive electrode film.
Figure 8:
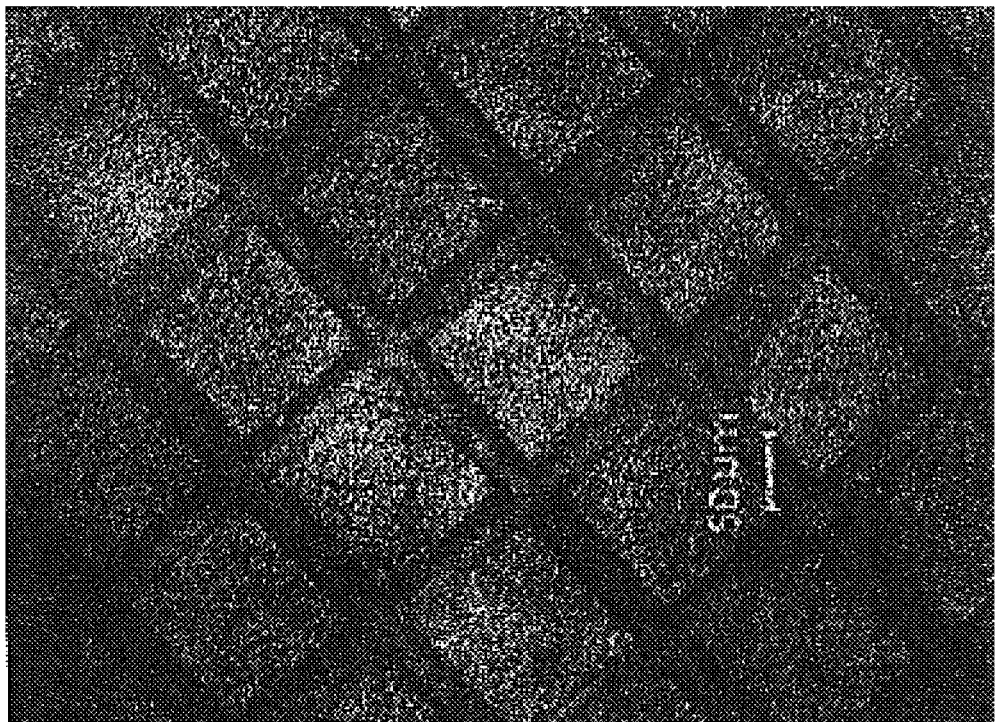
FIG. 8 is a photo of the surface of the inventive electrode film showing the size of the mesa shaped segments and the relative distance between each mesa shaped electrode in the array of mesa shaped electrodes.

The electrode film 12 of the present invention can also be used in a printer for printing on an electrode-less medium. As one example shown in FIG. 7, an electrode-less gyricon medium 18 could be fed between a backside electrode roller 60 and an electrode film roller 62. The electrode film roller 62 could use the electrode film 12 as its outer surface. An activation mechanism (not shown) would impart charge to the selected electrodes 52 immediately prior to the nip between the backside electrode roller and the electrode film roller, with the activated electrodes generating the electric field which "writes" on the electrode-less gyricon medium at the nip.

Although the present invention has been described with reference to preferred embodiments, workers skilled in the art will recognize that changes may be made in form and detail without departing from the spirit and scope of the invention.

What is claimed is:

1. An electronic display comprising:
    a display panel having a viewing surface and a backside surface opposing the viewing surface, the display panel comprising:
        particles which are optically anisotropic toward the viewing surface and responsive to changes in magnetic field; and
        a surrounding media containing the particles;
    an array layer in contact with the viewing surface of the display panel, the array layer being formed of an electrically non conductive material, wherein the array layer has a plurality of mesa shaped segments, each mesa shaped segment comprising:
a top face; and
side walls extending downward from the top face, wherein each of the mesa shaped segments provide a support structure for one of the electrodes; and
an electrode layer coating the array layer, the electrode layer formed of an electrically conductive material, the electrode layer exposed for contact by an electrical stimulus, the electrode layer providing a plurality of electrodes, each electrode of the electrode layer being partially electrically isolated from the other electrodes in the electrode layer, wherein the electrode layer is thicker on the top face than on the side walls producing resistive bridges between adjacent top faces, the resistive bridges partially electrically isolating each electrode from the other electrodes in the electrode layer.

2. The electronic display of claim 1, further comprising a stylus electrically connected to address select electrodes of the electrode layer.

3. The electronic display of claim 1, wherein the electrode layer is ITO.

4. An electronic display comprising:
a display panel having a viewing surface and a backside surface opposing the viewing surface, the display panel comprising:
particles which are optically anisotropic toward the viewing surface and responsive to changes in magnetic field; and
a surrounding media containing the particles;
an array layer in contact with the viewing surface of the display panel, the array layer being formed of an electrically non conductive material;
an electrode layer coating the array layer, the electrode layer formed of an electrically conductive material, the electrode layer exposed for contact by an electrical stimulus, the electrode layer providing a plurality of electrodes, each electrode of the electrode layer being partially electrically isolated from the other electrodes in the electrode layer; and
an electrode in contact with the backside surface of the display panel;
wherein the array layer provides an array of mesa shaped segments, wherein each mesa shaped segments provide a support structure for one of the electrodes, each mesa having a substantially flat top face and four side walls extending downward defining valleys relative to the top face, the sidewalls recess at included angles of 70 degrees or greater relative to the top faces; and
wherein the electrode layer has an electrode thickness over the mesa shaped segments of sufficient thickness and sufficient conductivity to form substantially conductive electrode plates, the electrode layer having a top face thickness and a valley thickness over the sidewalls, the sidewall thickness being thinner than the top thickness and of sufficient thinness and sufficient resistivity to form resistive bridges between adjacent electrode plates.

5. The electronic display of claim 4, further comprising a stylus electrically connected to address select electrodes of the electrode layer.

6. The electronic display of claim 4, wherein the electrode layer is ITO (Indium Tin Oxide).

7. A electrode film comprising:
a sheet formed of a substantially electrically insulative material, the sheet having a textured surface, the textured surface providing a plurality of mesa structures each having an electrode face extending generally in the plane of the textured surface and peripheral side walls around the electrode face defining valleys relative to the electrode face; and
a conductive layer deposited over the textured surface of the sheet, the conductive layer having an electrode thickness over the electrode faces of the mesa structures of sufficient thickness and sufficient conductivity to form substantially conductive electrode plates, the conductive layer having a valley thickness over the peripheral side walls which is thinner than the electrode thickness and of sufficient thinness and sufficient resistivity to form resistive bridges between adjacent electrode plates.

8. The electrode film of claim 7, wherein the electrode film is disposed in a printer.

9. The electrode film of claim 7, wherein the sheet and conductive layer are substantially transparent or translucent to visible light.

10. The electrode film of claim 7, wherein the sidewalls recess at included angles of 70 degrees or greater relative to the electrode faces.

11. The electrode film of claim 7, wherein substantially all mesa structures are coated with the conductive layer by a sputtering process.

12. The electrode film of claim 11, wherein the conductive layer is ITO (Indium Tin Oxide).

13. The electrode film of claim 12, wherein the ITO conductive layer is up to about 4 nm thick.

14. A method of making an electrode film substrate, the method comprising:
texturing a surface of a substrate into an array of mesa shaped segments having a repeatable mesa size and repeatable distance between each mesa shaped segment, the substrate being electrically non conductive; and
depositing a conductive coating on the surface of the substrate thereby forming an electrode layer with one electrode on each mesa shaped segment and resistive bridges surrounding each electrode to at least partially electrically isolate each electrode from the other electrodes in the electrode layer.

15. The method of claim 14, wherein the mesa shaped segments have a substantially flat top face and side walls extending downward from the top face, wherein the sidewalls recess at included angles of 70 degrees or greater relative to the top faces, each mesa side wall intersects with an adjoining mesa side wall to form a valley relative to the top face.

16. The method of claim 15, wherein the depositing step is performed by a sputtering process resulting in the top face electrode layer to be thicker than the side wall electrode layer to thereby forming resistive bridges between adjacent top faces, the resistive bridges surrounding each top face to at least partially electrically isolate each top face from the other top faces in the array.

17. The method of claim 16, wherein the conductive coating is ITO (Indium Tin Oxide).

* * * * *

UNITED STATES PATENT AND TRADEMARK OFFICE
CERTIFICATE OF CORRECTION

PATENT NO. : 6,700,695 B2
DATED : March 2, 2004
INVENTOR(S) : Engler, David A.

It is certified that error appears in the above-identified patent and that said Letters Patent is hereby corrected as shown below:

Title page,
Item [57], ABSTRACT,
Line 1, insert -- A segmented electrode film is used with a display panel, such as "gyricon" (or twisting particle) displays or other forms of electric paper, such as particulate electrophoretic displays, which are available from E-Ink Corporation. The display panel has a viewing surface and a backside surface opposing the viewing surface. The electrode film can be on the viewing surface, in which case the electrode film must be transparent, or the backside surface or in a printer. -- before "The display panel".
Line 6, delete "layer and" and insert -- layer. The array layer is --, in place thereof.
Line 7, delete "panel and having." and insert -- panel. The array layer is --, in place thereof.
Line 12, after "stimulus" insert -- , such as a stylus. --.

Column 1,
Line 11, delete "E-ink" and insert -- E-Ink --, in place thereof.

Column 5,
Line 14, delete "semiconductive" and insert -- semi-conductive --, in place thereof.

Column 8,
Line 44, delete "100 C" and insert -- 100° C --, in place thereof.

Column 9,
Line 12, after "has" delete "a" and insert -- an --, in place thereof.

Column 11,
Line 64, delete "non viewing" and insert -- non-viewing --, in place thereof.

Column 13,
Line 23, after "ITO" insert -- (Indium Tin Oxide) --.
Lines 60 and 63, delete "4" and insert -- 5 -- in place thereof.

UNITED STATES PATENT AND TRADEMARK OFFICE
CERTIFICATE OF CORRECTION

PATENT NO. : 6,700,695 B2
DATED : March 2, 2004
INVENTOR(S) : Engler, David A.

It is certified that error appears in the above-identified patent and that said Letters Patent is hereby corrected as shown below:

<u>Column 14,</u>
Line 1, delete "A" and insert -- An -- in place thereof.

Signed and Sealed this

Twenty-first Day of June, 2005

JON W. DUDAS
*Director of the United States Patent and Trademark Office*